United States Patent [19]

Eager, Jr. et al.

[11] Patent Number: 4,888,886

[45] Date of Patent: Dec. 26, 1989

[54] APPARATUS FOR USE IN IMPREGNATING ELECTRICAL CABLES

[75] Inventors: George S. Eager, Jr., Upper Montclair; Bogdan Fryszczyn, South Plainfield, both of N.J.; Ernest H. Thalmann, Southern Pines, N.C.

[73] Assignee: Empire State Electric Energy Research Corporation, New York, N.Y.

[21] Appl. No.: 100,776

[22] Filed: Sep. 24, 1987

[51] Int. Cl.$^4$ .............................................. F26B 25/00
[52] U.S. Cl. ........................................ 34/104; 34/107
[58] Field of Search .................... 34/104, 105, 107, 23, 34/41, 18, 16, 148, 21

[56] References Cited

U.S. PATENT DOCUMENTS

| | | |
|---|---|---|
| 3,252,834 | 5/1966 | Vincent . |
| 3,594,492 | 7/1971 | Bahder et al. . |
| 3,821,640 | 6/1974 | Bahder et al. . |
| 4,042,776 | 8/1977 | Matsuba et al. . |
| 4,145,567 | 3/1979 | Bahder et al. . |
| 4,256,921 | 3/1981 | Bahder . |
| 4,354,992 | 10/1982 | Bahder . |
| 4,372,988 | 2/1983 | Bahder . |
| 4,394,534 | 7/1983 | Bahder et al. . |
| 4,397,807 | 8/1983 | Bahder et al. . |
| 4,446,095 | 5/1984 | Katz et al. . |
| 4,519,759 | 5/1985 | Katz et al. . |
| 4,533,789 | 8/1985 | Katz . |
| 4,545,133 | 10/1985 | Fryszczyn et al. . |

Primary Examiner—Henry A. Bennet
Attorney, Agent, or Firm—Sandler & Greenblum

[57] ABSTRACT

A by-pass device, adapted to be connected between lengths of cable through which fluid is being passed and electric current is being conducted, and a piece of electrical equipment through which the electric current is to be conducted, which permits the fluid being conveyed to by-pass the piece of electrical equipment includes: a first member and a second member, each of the members being fittings composed of an electricity-and-fluid passage section adapted to be connected to a cable; an electricity passage section adapted to be connected to a piece of electrical equipment; and a fluid conveying section adapted to convey fluid in a divergent path away from the current of electricity; and a conduit connecting each of the fluid conveying sections so as to permit the fluid flow between the fluid conveying sections of each member to by-pass the electrical device without interrupting the circuit of electric current. A method for flushing cables connected to electrical equipment with fluid in a manner which permits the fluid passing through the cables to by-pass the electrical apparatus while permitting the electricity conducted by the cable to pass into and through the electrical equipment in an uninterrupted fashion throughout a cable system.

15 Claims, 7 Drawing Sheets

APPARATUS FOR USE IN IMPREGNATING ELECTRICAL CABLES

BACKGROUND OF THE INVENTION

1. Field of the Invention

The present invention relates generally to the technology of treating electrical cables with fluids. In particular, the present invention is directed to method and apparatus for treating electrical cables with fluids effective to retard "electrochemical tree" formation. The method of the present invention involves introducing and supplying fluid to a cable including a stranded conductor surrounded by an insulation layer in such a manner that interruption of the current of electricity through the conductor of the cable is not required.

2. Discussion of Background and Material Information

The transmission and distribution of electrical power is frequently accomplished using cables composed of an interior stranded conductor material covered or otherwise encased by insulation material. Such cables are particularly useful in underground cable systems wherein the cables may be directly buried or installed through ductwork. Regardless of the method of installation of the cables, the cables are normally exposed to environmental moisture throughout their use.

The following patents relate to representative examples of cable systems which may be used for such purposes. U.S. Pat. No. 3,594,492 is directed to a high-voltage electrical cable enclosed within a pipe which may be wrapped with a sheath or tapes of magnetic low-loss material.

U.S. Pat. No. 4,397,807 is directed to a cable for cryogenic use which includes an inner conductor and a solid polymeric insulator adapted to accommodate a collapsible spacer between the inner conductor and the polymeric insulator to further space the insulator away from the conductor so as to permit a greater shrinkage of the insulator. The invention claimed in this patent is the method of treating the cable for use in low temperatures without introducing damaging stresses during cool down in the insulation.

U.S. Pat. No. 4,394,534 relates to the previously discussed patent, and is directed to a coaxial cryogenic electrical cable having a collapsible spacer positioned between the inner conductor and the conductor shield.

U.S. Pat. No. 4,446,095 is directed to a method for manufacturing heat shrinkable tubing sleeves for use in splicing electrical cables.

U.S. Pat. No. 4,519,759 relates to the previously mentioned patent, and is directed to an apparatus used for manufacturing long links of such heat-shrinkable sleeves for use in splicing electrical cables.

U.S. Pat. No. 4,533,789 is directed to a high voltage electrical power cable with thermal expansion accommodation which includes an insulation shield having thick polymeric insulation constructed to have a metallic layer radially spaced from the inner semi-conducting layer.

U.S. Pat. No. 4,256,921 is directed to a moisture resistant high-voltage cable which has a composite jacket with inner and outer parts such that a corrugated moisture barrier is sandwiched between and bonded to these parts to prevent both radial and longitudinal flow of moisture in the cable.

Typically, however, high-voltage cables for underground installation are composed of an insulation layer of polyolefin material, such as polyethylene, crosslinked polyethylene or ethylene propylene rubber. A problem associated with the polyolefin covering of such electrical cables is that over time environmental moisture, which has a high dielectric constant and high conductivity, diffuses throughout the insulation layer of the cable through the intermolecular spaces in the insulation, which are relatively large in polyolefin materials, and tends to accumulate therein. The accumulated moisture forms into droplets, both in the intermolecular spaces and in microvoids and voids which may be present in the body of the insulation. Under electric fields, electroforces act on the droplets of moisture causing them to elongate in the direction of the field thereby decreasing the radii of the ends of the droplets which effects an increase in the strength of the electric field at the narrowed ends of the droplets. At sufficiently high field strengths, small electrical discharges occur at the narrowed ends of the droplets and cause concomitant decomposition of the insulation in the region of these discharges. As the insulation material decomposes, additional moisture is permitted to enter and accumulate in the decomposed area of the insulation thereby moving the electrical discharge region further into the insulation to result in a network or pattern of channels or voids throughout the insulation material. This type of insulation deterioration is known as "electrochemical tree formation". Insulation deterioration resulting from electrochemical tree formation causes the breakdown voltage of the insulation in the area of the electrochemical tree to decrease as the size of the electrochemical tree increases.

Over the years considerable effort has been expended in studying the causes and proposing solutions to the problems associated with electrochemical tree formation. For example, U.S. Pat. No. 3,252,834 is representative of an early prior art attempt to treat electrical cables by the introduction of treating compositions into the electrical cable to protect the cable against penetration by moisture and to otherwise prolong the useful life of the cable. The disclosed process involves introducing a treating composition under pressure for the purpose of physically expelling any moisture and air from the interior of the cable and for the purpose of applying a protective coating of the composition on the conductor insulation and interior surfaces of the cable sheathing. The procedure is accomplished by pumping a suitable liquid, such as varnish, silicone oil and solvent, under pressure through a section of the electrical cable. The particular method used permits this to be done even when the cable is in service. Afterwards, the treatment solution is disclosed as being moved from the cable for reuse in treating additional sections of cable. Related to this, U.S. Pat. No. 3,821,640 is directed to an accelerated method of testing the insulation of an insulated conductor for its susceptibility to treeing.

U.S. Pat. No. 4,354,992 is directed to a method and apparatus for fabricating insulated cables, particularly polymeric insulated electrical power cables, which are resistant to the formation and growth of electrical chemical trees.

U.S. Pat. No. 4,145,567, is directed to a solid dielectric cable for high-voltage, alternating current power transmission, which has been fabricated to reduce access of moisture into the cable, particularly to the inner face of the insulation, to such an extent as to make the cable highly resistant to the formation of electrochemical trees in the solid extruded insulation of the cable.

U.S. Pat. No. 4,042,776 is directed to a power cable designed to have a plastic electrical insulation which is partially or wholly composed of a plastic compound which contains an inorganic or organic electrolyte which ionizes when dissolved in water. When the solute dissolves in water, the electric conductivity of the electrolyte is increased in the insulator to render the electric field in a mass of minute voids filled with water relatively small so that the water tree can be prevented.

Recently, electrochemical tree formation and concomitant cable failures have become particularly troublesome in view of the popular use of underground cable systems in residential areas, and continued use of subterranean cables in urban areas. Although various efforts, such as those disclosed above, have been made to alleviate electrochemical tree formation in an attempt to extend the life of such cables and minimize problems which often result because of interruptions in electrical service, none of these efforts have been successful to an acceptable level prior to the invention set forth in U.S. Pat. Nos. 4,372,988 and 4,545,133.

In U.S. Pat. No. 4,372,988, a method and apparatus is disclosed for retarding electrochemical tree-type decomposition of polyolefin electrical insulation by saturating the insulation with a liquid having high resistivity and a low dielectric constant. In particular, this patent provides a method for the in situ repair of an underground high voltage electrical cable composed of a stranded conductor and a polyolefin insulation which involves continuously introducing an electrochemical tree retardant liquid to the conductor so as to cause the liquid to diffuse along between the strands of the conductor and into the insulation layer so as to fill electrochemical trees which may be present in the polyolefin insulation layer. In the case of treating a previously installed cable, this patent discloses that the cable should be dried before introducing the tree retardant liquid into the stranded conductor by heating the cable, for example by passing an electrical current through the conductor of the cable, or by passing a desiccative fluid through the conductor of the cable. The method of the invention set forth in U.S. Pat. No. 4,372,988 is performed by providing a reservoir for supplying electrochemical tree retardant liquid to the conductor at one end of the cable via connection with a flexible tube which is fitted over an end portion of the cable. Although the liquid supply may be accomplished under the force of gravity, a pump may be used to pressurize the liquid and supply the liquid to the input port of a supply valve which, when open, permits the pressurized liquid to pass through the flexible tube and to the conductor at the end of the cable over which the flexible tube is fitted. Thus, the liquid then flows through the inter-strand interstices in the conductor and diffuses through the insulation of the cable so that eventually an entire length of cable and its insulation become saturated with the electrochemical tree retardant liquid.

Related to this, U.S. Pat. No. 4,545,133 is directed to a method and apparatus for retarding electrochemical tree decomposition of electrical insulation by flushing moisture from the insulation of installed power cables with a fluid having a low moisture content, such as nitrogen. By this procedure, the insulation of the power cables is dried, and maintained dried by a continuous flow of dry fluid through the conductor and insulation while the cable is energized. To this end, a dried fluid is disclosed as being introduced into the stranded cable conductor from which it diffuses through the conductor shield and polyolefin insulation. Although the introduction of fluid is disclosed as taking place at the time of installation of the cable, it is also disclosed that the dry fluid may be maintained flowing through the cable while the cable is in use. This is particularly advantageous because the dry fluid will continue to remove the moisture as it reenters the cable insulation structure so as to retard the formation of electrochemical trees. This patent also discloses an apparatus which permits the fluid to be introduced and withdrawn from the cable, particularly while the cable is energized and in use. To this end, the disclosed entry and exit device is installed by stripping the insulation shield from the cable and forming a small hole through exposed insulation near the center of the section of the cable where the insulation shield has been removed. A plastic hose connection is then fastened tightly over the hole using plastic holders, such as plastic ties and rubber washers, in an attempt to minimize leakage of the fluid to the environment, particularly when internal fluid pressures of up to 50 psig are generated while the fluid is being forced through the cable system. It is then recommended that a few layers of electrical insulating tape be placed over the cable insulation in the area where the entry and exit device have been tapped into the cable.

Notwithstanding the effectiveness of the inventions set forth in U.S. Pat. Nos. 4,372,988 and 4,545,133 for treating electrochemical tree deterioration of polyolefin insulation throughout a given length of cable, the methods suffer from certain shortcomings and disadvantages. In this regard, the methods and apparatus of U.S. Pat. Nos. 4,372,988 and 4,545,133 are limited to the entry and exit of the electrochemical tree retardant fluid with respect to a given length of cable in a point-to-point installation between pieces of electrical equipment, such as pad-mount transformers. The main disadvantage with this type of arrangement is that a separate system for introducing and withdrawing the electrochemical tree retardant fluid from the length of cable must be installed at each end of the cable between each pad-mount transformer, switch or other piece of electrical equipment. As a practical matter, such replication of supply reservoirs and entry and exhaust ports are extremely impractical and expensive for use in large-scale cable systems, such as those which would be used for a residential area or other community.

Similarly, although the method for flushing moisture from the insulation of installed power cables with a fluid having a low moisture content, as disclosed in U.S. Pat. No. 4,545,133, is somewhat effective for its intended purposes, the disclosed method and apparatus likewise suffers from disadvantages. In particular, the apparatus disclosed by U.S. Pat. No. 4,545,133 to permit the fluid to enter and exit from the cable has a structure which is particularly difficult to use and is more prone to permit leakage of the fluid from the system than the apparatus disclosed in the present invention.

The method and apparatus of the present invention remedy such shortcomings of U.S. Pat. No. 4,372,988 by providing means for reducing the number of supply reservoirs and related apparatus, by providing an apparatus for connecting lengths of cable to electrical equipment, such as pad-mount transformers, in such a way as to permit the current to pass between the lengths of cables through the piece of electrical equipment while causing the electrochemical tree retardant fluid to by-pass the piece of electrical equipment and pass from one length of cable to another length of cable attached to the equipment in an uninterrupted fashion throughout a large-scale cable system including numerous pieces of electrical equipment interposed between lengths of cable. Thus, the present invention is advantageous in that it permits the treatment of a plurality of lengths of cable connecting various pieces of electrical equipment while requiring only one reservoir for the electrochemical tree retardant fluid in contrast to the system disclosed by U.S. Pat. No. 4,372,988 which requires a liquid supply reservoir and entry and exit ports for each length of cable between pieces of electrical equipment.

Moreover, the method and apparatus of the present invention remedy the previously discussed disadvantages of the entry and exit device disclosed by U.S. Pat. No. 4,545,133 to permit the introduction of fluid into the interstitial spaces of the cable. In contrast to the cut-and-paste type of procedure disclosed by U.S. Pat. No. 4,545,133, a uniquely designed T-shaped fitting has been developed which can be easily inserted between two lengths of cable in a relatively simple and straightforward manner using conventional pieces of electrical equipment to secure the lengths of the cable and the fitting together in a manner which essentially prevents any leakage from occurring.

As will be better understood from the description of the invention presented hereinafter, the present invention is directed to a method and apparatus for treating electrical cables with fluid effective to flush or dry the cable, as well as to retard electrical tree formation, in a relatively simple and straightforward manner using apparatus and devices which permit the introduction of the appropriate fluid continuously through the cable system over a length of cable heretofore not thought possible using novel and unique devices and fittings which have been improved over what has been taught or suggested by the prior art to minimize leakage of the fluid into the environment surrounding the cable system.

SUMMARY OF THE INVENTION

An object of the present invention is to provide a method for passing fluid through the interior of an electric cable of a cable system. The method involves providing a fluid supply fitting having a plurality of elongate sections extending radially from a point of intersection. The sections of the fitting include a fluid section having a hollow core of conductive material adapted to be connected to a source of fluid or reservoir for supplying fluid; an electricity section including a core of conductive material adapted to be connected to a source of electric power; and an electricity-and-fluid section including a hollow core of conductive material adapted to be connected to a cable. The fitting is then connected so that the electricity section is in electrical contact with a source of electric power, and so that the electricity-and-fluid section is connected to the cable in a manner which permits electricity to be conducted from the electric power source through the fitting and into the cable. The fluid section of the fitting is then connected to the source of fluid. After the connections have been made, fluid from the fluid source is introduced through the fluid section and into the cable, without interrupting the passage of electric current through the fitting; continuing to supply the fluid to the cable so that the fluid is dispersed throughout essentially the entire length of the cable.

Another object of the present invention is to provide a method for passing fluid through the interior of a length of cable of an electric cable system, as described above, which also involves providing a fluid withdrawal fitting having a plurality of elongated sections extending radially from a point of intersection. The structure of the fitting similarly includes a fluid section having a hollow core of conductive material adapted to be connected to a reservoir for receiving fluid; an electricity section, including an essentially solid core of conductive material adapted to be connected to an end of a length of electric power cable through which electric current is to be conducted; and an electricity-and-fluid section, including a hollow core of conductive material in electrical contact with the solid core of conductive material of the electricity section and in communication with the hollow core of conductive material of the fluid section, adapted to be connected to an end of another length of cable. The fluid withdrawal fitting is then installed in the electric cable system so that the electricity-and-fluid section is fastened to an end of a length of cable through which electric current and fluid is being conveyed, and the electricity section is in electrical contact with an end of another length of cable so that the current of electricity passing through the one length of cable is conducted through the hollow core of conductive material of the electricity-and-fluid section through the solid core of conductive material of the electricity section and into the other length of cable. The fluid section of the fitting is connected to the reservoir for receiving fluids. Fluid from the length of cable is then conveyed through the hollow core of conductive material of the electricity-and-fluid section and through the hollow core of conductive material of the fluid section to permit the fluid to be withdrawn from the cable and conveyed to the reservoir.

A further object of the present invention is t provide a method for passing fluid through the interior of a length of cable of an electric cable system, as described above, wherein the electricity section and the electricity-and-fluid section are longitudinally aligned along a common longitudinal axis with respect to their point of intersection, preferably wherein the fluid section extends radially from the point of intersection at substantially a right angle with respect to the longitudinal axis along which the electricity section and the electricity-and-fluid section are aligned, so that the fluid fitting is generally T-shaped.

Another object of the present invention is to provide a method for passing fluid through the interior of a length of cable of an electric cable system, as described above, wherein the cores of conductive material of the fluid section, the electricity section, and the electricity-and-fluid section are covered by a layer of insulation material, and preferably wherein the layer of insulation is surrounded by an outer jacket of semi-conductive material.

Another object of the present invention is to provide a method for passing fluid through the interior of a length of cable of an electric cable system, as described above, wherein the fluid section further includes a hollow tube of non-conducting material having one end fastened to the end of the hollow core of conductive material and another end fitted to a conduit connected to a source or reservoir of fluid.

It is another object of the present invention to provide a method for passing fluid through a cable system including at least one electrical apparatus connected between two lengths of cable through which fluid is being passed and electricity is being conducted which involves providing a fluid by-pass apparatus composed of two members. Each of the members of the by-pass device have an electricity-and-fluid section including a hollow core of conductive material adapted to be connected to an end of a length of cable; an electricity section including a substantially solid core of conductive material in electrical contact with the hollow core of conductive material of the electricity-and-fluid section, adapted to be connected to the electrical apparatus; and a fluid by-pass section having a hollow core of conductive material in communication with the hollow core of conductive material of the electricity-and- fluid section and being adapted to be connected to a conduit. The fluid by-pass apparatus is then installed so that each of the electricity-and-fluid sections is fastened to an end of a length of cable, and each of the electricity sections is in electrical contact with an electrical apparatus. Each of the fluid by-pass sections are then connected to the conduit. A current of electricity is then conducted first from one of the lengths of the cable through the hollow core of conductive material of one of the electricity-and-fluid sections and the solid core of conductive material of one of the electricity sections into the electrical apparatus, and then from the electrical apparatus through the solid core of conductive material of another of the electricity sections and the hollow core of another of the electricity-and-fluid sections into another length of cable. As this occurs, fluid passing through one of the lengths of cable is conveyed first through the hollow core of conductive material of one of the electricity-and-fluid sections, then through the hollow core of conductive material of one of the fluid by-pass sections and into the conduit so that the fluid is permitted to pass through the conduit and into the hollow core of conductive material of the fluid by-pass section of the other member of the by-pass apparatus. The fluid continues to pass through the hollow core of conductive material of the other electricity-and-fluid section into the other length of the cable, so that the fluid by-passes the electrical apparatus without interrupting the current of electricity conducted from one length of cable through the electrical apparatus and into the other length of cable.

It is a further object of the present invention to provide a method for passing fluid through a cable system so as to by-pass electrical apparatus, as described above, wherein the electricity sections and the electricity-and-fluid sections are longitudinally aligned along a common longitudinal axis with respect to one another and wherein the fluid by-pass section extends from a point of intersection with the electricity section and the electricity-and-fluid section at substantially a right angle with respect to the longitudinal axis along which the electricity section and the electricity-and-fluid section are aligned, and most preferably wherein the by-pass is generally H-shaped.

It is another object of the present invention to provide a method for passing fluid through a cable system, as described above, wherein the cores of conductive material of the fluid by-pass section, the electricity section, and the electricity-and-fluid section are covered by a layer of insulation material, and preferably wherein the layer of insulation is surrounded by an outer jacket of semi-conductive material.

It is a further object of the present invention to provide a method for passing fluid through a cable system, as described above, wherein the fluid by-pass section further includes a hollow tube of non-conducting material having one end fitted to an end of the hollow core of conductive material and another end fitted or otherwise fastened to the conduit.

It is another object of the present invention to provide a method for passing fluid through a cable system, as described above, wherein the cable includes stranded conductive material surrounded by polyolefin insulation. The fluid preferably is a liquid having properties of resistivity in excess of $10^9$ ohms per centimeter cube, a dielectric constant below 20, and sufficiently low molecular weight to permit ready penetration into polyolefin insulation but sufficiently high molecular weight to prevent rapid diffusion from the insulation. More preferably, the fluid is a member selected from the group consisting of dried nitrogen, dry air, glycerol, silicon fluid, ethylene glycol, triethylene glycol, dimethylsilane, acetophenone, and dodecanol.

Another object of the present invention is to provide an apparatus for introducing and withdrawing fluid with respect to the interior of a cable preferably composed of strands of conductive material covered with insulation. The apparatus includes a fitting having a plurality of elongate sections extending radially from a point of intersection, which include a fluid section having a hollow core of conductive material with an end adapted to be connected to a source or reservoir for fluid; an electricity section having an essentially solid core of conductive material, adapted to be connected to a conductor of electric current; and an electricity-and-fluid section having a hollow core of conductive material in communication with the hollow core of conductive material of the fluid section adapted to be connected to a length of cable through which fluid is to be passed and electric current is to be conducted. The electricity section and the electricity-and-fluid section are preferably longitudinally aligned along a common longitudinal axis with respect to the point of intersection. The fluid section preferably extends radially from the point of intersection at substantially a right angle with respect to the longitudinal axis along which the electricity section and the electricity-and-fluid section are aligned, preferably so that the fitting is generally T-shaped.

Another further object of the present invention is to provide an apparatus for introducing and withdrawing fluid with respect to the interior of a cable, as described above, wherein the cores of conductive material of the fluid section, the electricity section, and the electricity-and-fluid section are covered by a layer of insulation material, preferably wherein the layer of insulation is surrounded by an outer jacket of semi-conductive material. The layer of insulation and the outer jacket of semi-conductive material are preferably molded into an integral unit, preferably from EPDM materials.

Another object of the present invention is to provide an apparatus for introducing and withdrawing fluid with respect to the interior of a cable, as described above, wherein the fluid section further includes a hollow tube of non-conducting material having one end fitted or otherwise fastened to an end of the hollow core of conductive material and another end adapted to be fitted or otherwise fastened to a conduit connected to the reservoir of fluid.

It is another object of the present invention to provide a by-pass device adapted to be connected to two lengths of cable through which fluid is being passed and electric current is being conducted and to a piece of electrical equipment through which the electric current is to be conducted, which includes a first member and a second member. Each of the members of the by-pass device include an electricity-and-fluid section having a hollow core of conductive material adapted to be connected to an end of one of the two lengths of cable; an electricity section having a substantially solid core of conductive material in communication with the hollow core of conductive material of the electricity-and-fluid section and adapted to be connected to the piece of electrical equipment; and a fluid by-pass section having a hollow core of conductive material in communication with the hollow core of conductive material in the electricity-and-fluid section and an end adapted to be connected to a conduit for conveying fluid in a divergent path away from the electric current before the fluid reaches the piece of electrical equipment. Each of the members is interconnected by a conduit communicating between each of the hollow cores of conductive material of the fluid by-pass section so as to permit fluid to by-pass the electrical equipment without breaking the circuit of electric current through the lengths of cables and the piece of electrical equipment. The electricity section and the electricity-and-fluid section are preferably longitudinally aligned along a common longitudinal axis. The fluid by-pass section extends from a point of intersection with the electricity section and the electricity-and-fluid section at substantially a right angle with respect to the longitudinal axis along which the electricity section and the electricity-and-fluid section are aligned, so that the by-pass device is generally H-shaped.

It is a further object of the present invention to provide a by-pass device adapted to be connected to two lengths of cable and to a piece of electrical equipment as described above, wherein the cores of conductive material of the fluid by-pass section, the electricity section, and the electricity-and-fluid outlet section are covered by a layer of insulation material, and the layer of insulation is preferably surrounded by an outer jacket of semi-conductive material. The layer of insulation and the outer jacket of semi-conductive material are preferably molded into an integral unit, preferably from EPDM materials.

It is another object of the present invention is to provide a by-pass device adapted to be connected to two lengths of cable a piece of electrical equipment, as described above, wherein the fluid by-pass section further includes a hollow tube of non-conducting material having one end fastened or otherwise fitted to one end of the hollow core of conductive material and another end fitted or otherwise fastened to the conduit.

In accordance with the present invention, methods and apparatus are provided for introducing and withdrawing fluid from lengths of cable and for by-passing electrical equipment when power distribution cables are rejuvenated by drying and/or impregnating the insulation of installed cables interconnecting the equipment without interrupting service.

DETAILED DESCRIPTION

In accordance with the present invention, the growth of electrochemical trees in cable insulation can be retarded when the intermolecular spaces and the voids existing in the insulation and the voids existing at the interfaces between the insulation and other elements of the cable are filled with a high resistance, low dielectric constant liquid to retard entry of moisture into the insulation thereby preventing the formation of electrochemical trees in the insulation in a manner which permits continuous and uninterrupted flow of electric current as well as the treatment fluid through a large-scale electrical circuit.

Fluids which are suitable for purposes of the present invention include glycerol, silicon fluid, ethylene glycol, triethylene glycol, dimethylsilane, acetophenone ($C_6H_5COCH_3$) and dodecanol $CH_3(CH_2)_{10}CH_2OH$. Other liquids having properties of high resistivity, e.g., above $10^9$ ohms per centimeter cube, low dielectric constant, i.e., below 20, and good properties of penetration into insulation materials are also believed to be suitable for purposes of functioning as electrochemical tree retardant fluids of the present invention. In this latter respect, it will be appreciated that liquids having a low molecular weight will penetrate more easily into the insulation material, but care should be taken in the selection of the liquid to ensure that the molecular weight is not too low, otherwise it will quickly diffuse out of the insulation thereby allowing the insulation to again become susceptible to electrochemical tree formation. The method and apparatus of the present invention can also be used, however, to flush the cable system with a dry fluid, such as nitrogen, if so desired.

Figure 1:
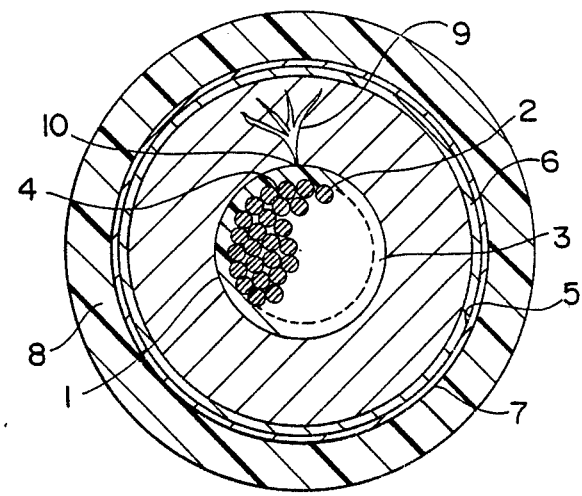
FIG. 1 is a cross-section of a polyolefin insulated extruded cable in which electrochemical trees have formed in the insulation.

Although a variety of cables including an interior conductor and insulation covering may be used for purposes of the present invention, the present invention is particularly suitable for use with cables composed of interior stranded conductive material covered by polyolefin insulation, such as polyethylene, cross-linked polyethylene, or ethylene propylene rubber. As previously mentioned, the liquid used as the electrochemical tree retardant fluid should exhibit good penetration properties into polyolefin insulation. FIG. 1 shows a cross-section of a typical polyolefin insulated extruded cable which may be used with the apparatus in performing the method of the present invention. The conductor 1 of the cable is composed of a plurality of strands 2 of, for example, copper or aluminum wire. Surrounding the conductor 1 is a semiconducting conductor shield 3 which typically is composed of a carbon-filled plastic or thermoset material, for example, having a thickness of about 30 mils. As shown, interstices 4 exist between the conductor 1 and the conductor shield 3, and also between the individual strands 2 of the conductor. Surrounding the conductor shield 3 is a body of polyolefin insulation 5 which is composed of a material, such as polyethylene, cross-linked polyethylene, or ethylene propylene rubber. The body of insulation 5 is, in turn, surrounded by a semiconducting insulation shield 6 and by metallic shield 7 composed, for example, of wires, or flat or corrugated metallic ribbons or tapes. The metallic shield 7 may, optionally, be covered by a polyolefin jacket 8. As previously discussed, when moisture diffuses into the intermolecular spaces of the insulation and the insulation is subjected to high voltage stresses, the insulation becomes susceptible to the formation electrochemical trees 9. These stresses tend to occur in portions of the cable 10 having imperfections, such as contaminants or protrusions. Although not as susceptible to electrochemical tree formation as the above-described cable, cables having a composite jacket to prevent moisture from entering the insulation layer of the cable, as set forth in U.S. Pat. No. 4,256,921, may also be connected to electrical installations and treated in accordance with the present invention. In addition, other cables, such as those disclosed in U.S. Pat. No. 4,145,567, may be used as well as cables such as those disclosed in U.S. Pat. No. 4,042,776, despite their disclosure that the insulation of the cable is specially formulated to prevent deterioration of the insulation.

Figure 2:
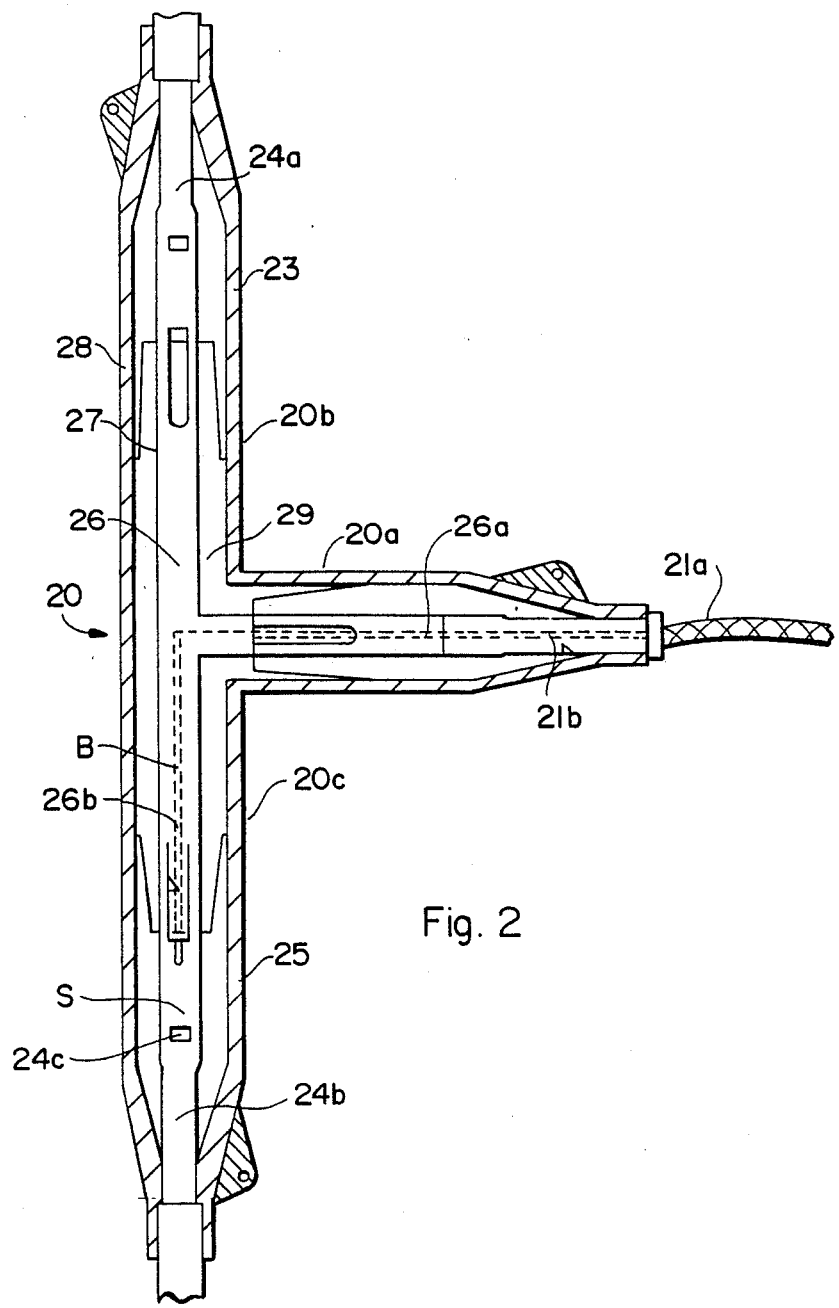
FIG. 2 is a transverse section of a "tee" device used to introduce fluid into a cable.

An apparatus in accordance with the present invention which permits fluid to be introduced into the interior of a cable, such as the one described above, is identified herein as fluid supply fitting designated generally in FIG. 2 as element 20. The fluid supply fitting is composed of a fluid entry section 20a adapted to be connected to a supply of fluid (not shown) via conduit 21a. The fluid supply fitting is also composed of an electricity entry section 20b adapted to be connected by means of plug 23 to a length of cable 24a in communication with an electric power source. The fluid introduction fitting is also composed of an electricity and fluid exit section 20c which is adapted to be connected to a length of cable 24b, by means of plug 25, into which fluid is to be introduced and supplied, which in turn is connected to a piece of electric equipment, such as a pad-mount transformer, located downstream from the fluid introduction fitting. The fluid supply fitting is constructed to have an inner core of conductive material, e.g., copper stud 26, preferably surrounded by a layer of conductive material 27, which is suitable for the rated circuit voltage for passing the current from the end of one cable 24a to the end of the other cable 24b connected to the fitting. The exterior of the fitting is a polymeric semiconducting covering 28. A layer of insulation 29 is interposed between the layer of conductive material 27 and the exterior semi-conducting covering of jacket 28. The outer covering or jacket 28 is preferably a layer of molded conductive EPDM, preferably about ⅛ inch thick, to provide a ground shield for essentially a dead-front construction. The layer of insulation 29 is preferably insulating EPDM which is molded to exert a uniform concentric pressure on the insulation of mating parts to provide a fluid sealing effect. As shown in FIG. 2, copper stud 26 is provided with a bore B extending through copper stud sections 26a and 26b which interconnect so as to permit the passage of fluid therethrough. Copper stud section 26a is preferably connected by means of tube 21b, composed of a non-conducting material, such as a suitable polymer, to conduit 21a so that fluid would pass from conduit 21a initially through tube 21b before entering copper stud section 26a, and copper stud section 26b. As the fluid exits copper stud section 26b it enters the space S provided between the end of copper stud section 26b and the strands of conductor material 24c of cable 24b. Once this space is filled, the fluid then seeps into the interstices of the stranded conductor material in its passage through the cable system. The plug 25 has substantially the same layered construction as the previously described tee splice housing. In this regard, the plug is also molded of EPDM compounds. The outer jacket is preferably ⅛ inch thick and is molded conductive EPDM to provide a ground shield for dead-front construction. Immediately to the interior of the outer jacket is an intermediate layer of insulating EPDM molded to exert a uniform concentric pressure on the insulation of the mating parts to provide a fluid sealing effect. Inasmuch as plug 25 forms a seal when connected with section 20c of the fluid supply fitting, none of the fluid introduced into space S leaks from the fitting but is forced through the strands of wire into the insulation layer of the cable.

The fluid supply fitting may be made, for example, by modifying commercially available 150T and K150T models of Elastimold brand tee splices. The 150T and K150T tee splices are fully-shielded, fully submersible, separable insulated connectors designed to provide a three-way disconnectable cable connection when used with appropriate mating products, also manufactured and sold under the Elastimold brand of electrical connector components. The 150T and K150T are designed with two plug ends and one receptacle end. The housing for the tee is molded of EPDM compounds. An outer jacket of ⅛ inch thick molded conductive EPDM is provided as a ground shield for dead-line front construction. An inner shield of molded conductive EPDM material precludes subjecting entrapped air to electrical stress. The interior of the tee splice is a T-shaped stud of conductive material, such as copper, adapted to interconnect with appropriate male and/or female contacts in electrical components to which the tee splice is interconnected. The tee splice housing is modified in accordance with the present invention by providing a bore through the leg of the T-shaped stud, which passes through the receptacle end of the tee splice housing, and by providing a bore through one arm of the T-shaped stud, which passes from a plug end of the tee splice housing to interconnect with the bore provided in the previously mentioned leg which passes through the receptacle end of the tee splice housing. In this way, appropriate fluid introduced into the end of the leg of the T-shaped stud is permitted to flow freely through the bore in the leg and out from the bore through the arm of the stud. Thus, although the tee splice housing which may be used for purposes of the present invention is a stock electrical device, its modification and use in accordance with the present invention, as more specifically described in reference to FIG. 2, however, is not taught by the art.

Figure 3:
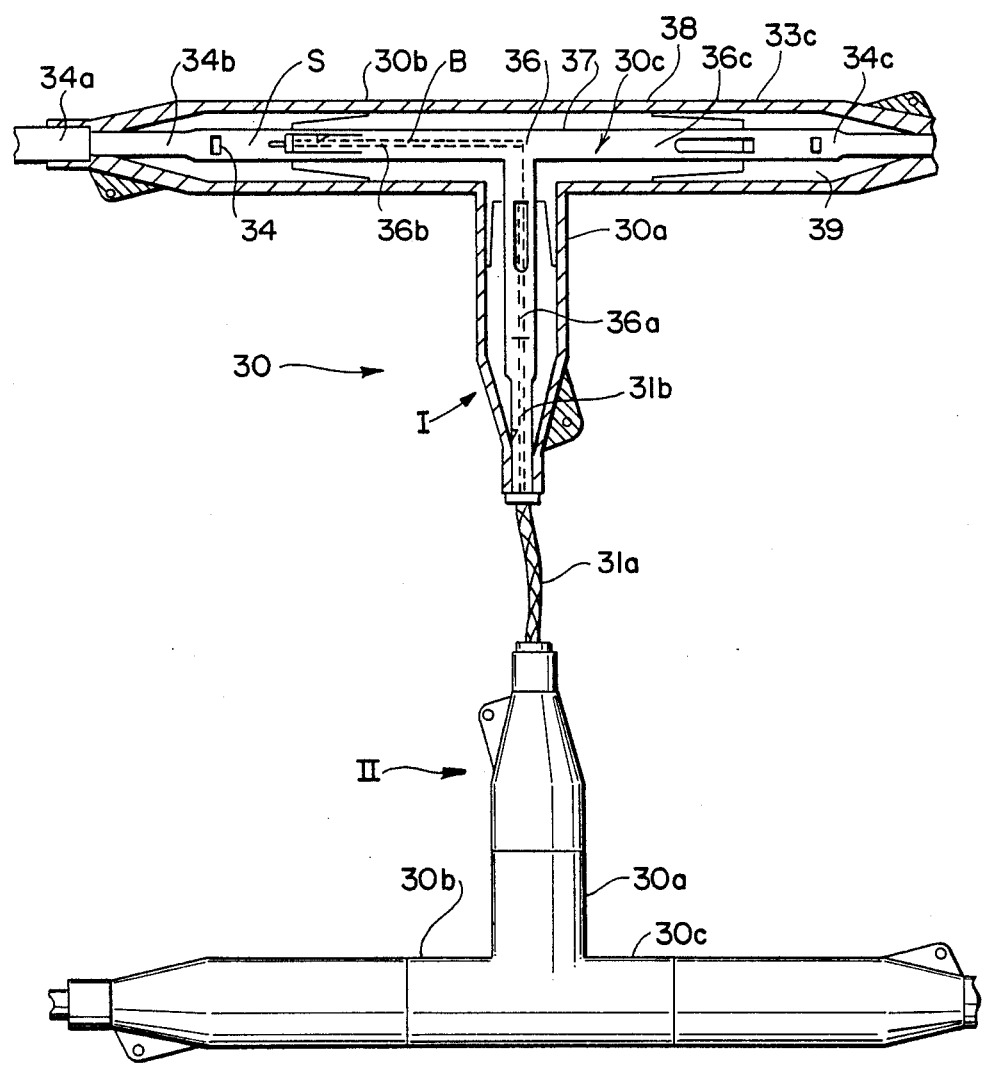
FIG. 3 is a transverse section of an H-shaped by-pass device for connecting lengths of cable to a piece of electrical equipment while permitting electrochemical tree retardant fluid to by-pass the piece of electrical equipment.

In the preferred embodiment of the by-pass device of the present invention, shown in FIG. 3, the by-pass apparatus, generally designated as 30, is composed of two members I and II each of which has a construction identical to each other and essentially the same as the fluid introduction fitting described above with respect to FIG. 2. Referring to member I, shown in cut-away, each of the members of the fluid by-pass device is composed of a fluid by-pass section 30a adapted to be connected to its counterpart in member II via conduit 31a. The fluid by-pass device is also composed of an electricity-and-fluid section 30b adapted to be connected to a length of cable 34a, by means of plug 33c, which in turn is connected to either a fluid supply fitting 20 or another fluid by-pass device 30. The fluid by-pass device is also composed of an electricity section 30c which is adapted to be connected by means of plug 33c to a length of cable 34c, to a piece of electric equipment, such as a pad-mount transformer, directly or via an electrical connector such as an elbow (not shown). The fluid by-pass device is constructed to have an inner copper stud 36, preferably surrounded by a layer of conductive material 37, which is suitable for passing electric current from an end of cable 34c to an end of cable 34b connected to the by-pass device. The exterior of the by-pass device is a polymeric semi-conducting covering 38. A layer 39 of insulation is interposed between the layer of conductive material 37 and the exterior semi-conducting layer 38. The outer covering or jacket 38 is preferably a layer of molded conductive EPDM, preferably about ⅛ inch thick, to provide a dead-front construction. The layer of insulation 39 is preferably insulating EPDM which is molded to exert a uniform concentric pressure on the insulation of mating parts to provide a fluid sealing effect. The plug has essentially the same construction as each of the previously described members of the by-pass device. In this regard, the plug is also molded of EPDM compounds. The outer jacket is preferably ⅛ inch thick and is molded conductive EPDM to provide a ground shield for dead-front construction. Immediately to the interior of the outer jacket is an intermediate layer of insulating EPDM molded to exert a uniform concentric pressure on the insulation of the mating parts to provide a fluid sealing effect. As shown in FIG. 3, copper stud 36 is provided with a bore B extending through copper stud sections 36a and 36b which interconnect so as to permit the passage of fluid therebetween. Copper stud section 36a is preferably connected by means of tube 31b, composed of a non-conducting material, such as a suitable polymer, to conduit 31a so as to prevent current from passing therethrough while permitting the fluid to pass from copper stud section 36a, through tube 31b into conduit 31a which in turn conveys the fluid into corresponding elements in member II only in the reverse order. As the fluid seeps from the interstices of cable 34a, it enters the space S provided between the end of copper stud section 36b and the strands of conductor material 34a of cable 34. Once this space is filled, the fluid then passes into the bore B of copper stud section 36b in its passage through the by-pass device.

Figure 4:
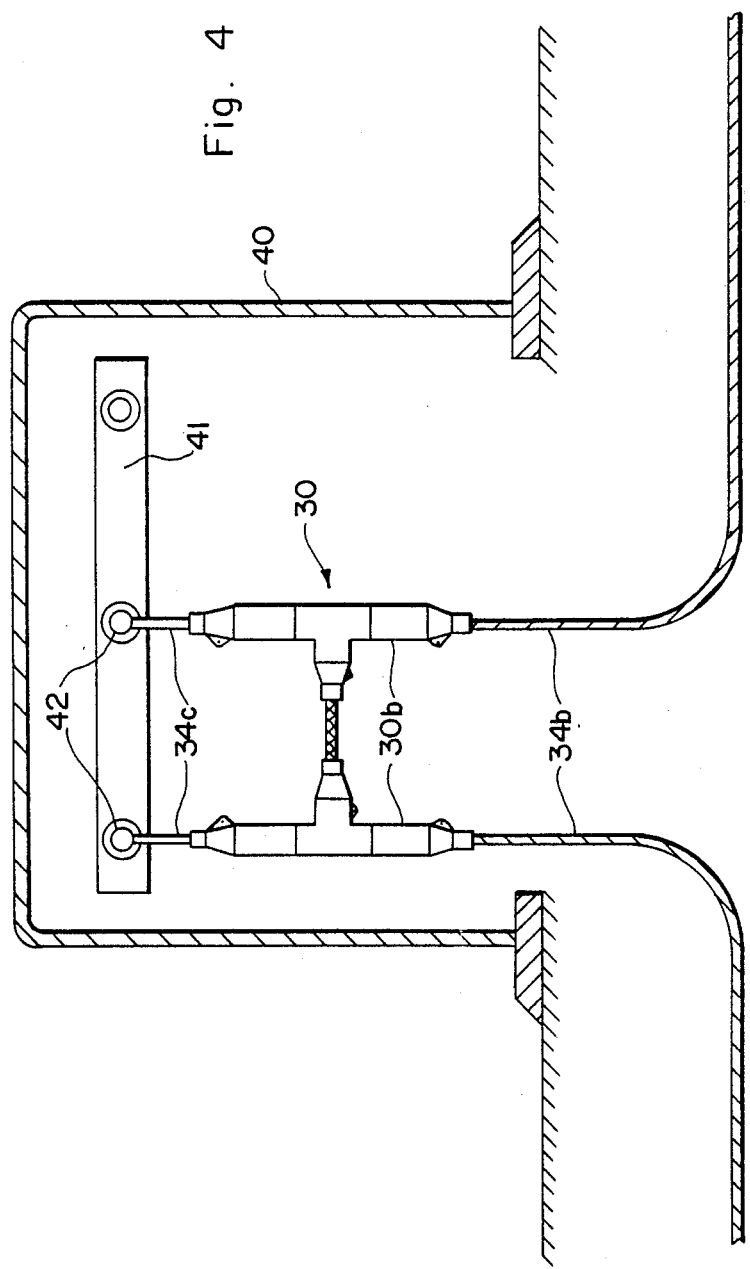
FIG. 4 is a side view of a typical installation of the by-pass apparatus, shown in FIG. 3, connected to a pad-mount transformer.

The manner by which the fluid by-pass device, discussed above, is installed in a pad-mount transformer is illustrated in FIG. 4. The H-shaped by-pass 30 is mounted inside cover 40 of the pad-mount transformer 41. The high-voltage underground cables 34b connect to two lower electricity-and-fluid sections 30b of the by-pass device. The lengths of cables 34c connect to elbows 42 of the transformer. Referring to FIG. 3 for the more detailed description of the by-pass device, after fluid passes up through the length of cable 34b, appearing on the left in FIG. 4, it passes into bore B of copper stud section 36b and then in sequence through the bore in by-pass section 36a into polymeric tube 31b, conduit 31a and then into tube 31b in the other member of the by-pass shown on the right side in FIG. 4 and in turn through the bore in copper stud section 36a, copper stud section 36b, into space S and out through the strands of conductive material of cable 34a. As this occurs, the copper studs of the by-pass apparatus of the present invention, being highly conductive, permit the flow of electric current through copper stud sections 36b and 36c, from the cable 34b to the elbows 42 of the transformer. The electric current, however, does not pass through copper stud section 36a in by-pass sections 36a from member of the by-pass device to the other member of the by-pass device due in part to the position of tube 31b composed of insulation material which prevents the flow of current across conduit 31a between the two members of the by-pass device.

Figure 5:
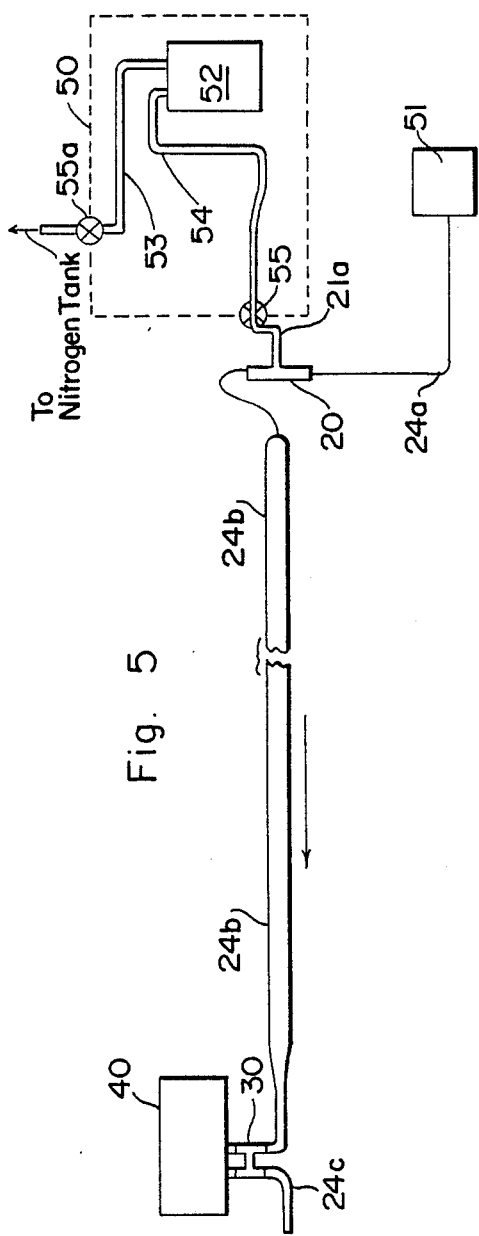
FIG. 5 is a schematic illustration of a cable connected to a supply of fluid and a source of electric current at one end, and a piece of electrical equipment by means of the by-pass device, shown in more detail in FIG. 4.

Referring now to FIG. 5, the fluid supply fitting 20 is shown in its connection to fluid supply apparatus 50 via conduit 21a, a source of electrical current 51 via length of cable 24a and length of cable 24b, in a manner described in more detail above with respect to FIG. 2. The liquid supply apparatus 50 is shown as being composed of a fluid supply tank 52 which contains a supply of electrochemical tree retardant liquid in the bottom portion and pressurized dry nitrogen in the top portion. Alternatively, fluid supply apparatus 50 may be used to supply a dissociative fluid, and preferably gas, such as dry nitrogen, to the cable system. Dry gas is supplied through valve 55a and conduit 53 and pressurized in supply tank 52. The supply valve 55 is connected to an end portion of conduit 21a, as shown in more detail in FIG. 2. In operation, electrochemical tree retardant fluid flows from supply tank 52 through the input port of supply valve 55. When supply valve 55 is opened, the liquid, which may be pressurized by a pump or other conventional means for pressurizing (not shown), passes through conduit 21a through the fluid introduction fitting 20, in a manner described above with respect to FIG. 2. In this regard, the appropriate fluid is furnished to fluid supply fitting 20 through bore B provided in copper stud section 26a and copper stud section 26b prior to filling space S after which the fluid seeps into strands of conductive material 24c of cable 24b. The fluid continues to seep into the interstices 4 of cable section 24b and flows along the entire length of cable section 24b via the interstices 4 between the strands of conductor 24c eventually filling these interstrand interstices and also filling any voids existing in the insulation or at the interface between the conductor and the insulation. As shown in FIG. 5, cable 24b is connected to the by-pass device 30 of the present invention, in a manner similar to that which is described in more detail above with respect to FIGS. 3 and 4, to an electrical apparatus, such as transformer 40. Accordingly, fluid supply fitting 20 permits fluid to be introduced and supplied to cable 24 without interrupting the flow of electric current from the electric power source. Thus, electricity and fluid may both be supplied simultaneously to the cable system provided with the apparatus of the present invention.

As generally shown in FIG. 5, cable 24b is connected to fluid-and-electricity section 30b of by-pass device 30. Referring to FIG. 3 for details, the strands 34c of length of cable 34b are exposed so as to permit the fluid seeping through the interstices 4 of the conductive material to seep into space S then in to the bore B provided in copper stud section 36b and copper stud section 36a of the by-pass device 30. As previously described, the copper stud section 36a is connected to a hollow tube 31b of insulating material which continues to convey the fluid from copper stud section 36b to conduit 31a into corresponding elements of a complementary member II of the by-pass device, i.e., tube 31b, copper stud section 36b, copper stud section 36a, space S, and into the interstices between the strands of conductive material 34a of the length of cable 34 which is fitted into fluid-and-electricity section 30b of member II of the by-pass device. Simultaneously, electric current conducted by cable 24b continues to pass through by-pass device 30 by means of conductive material 37 which is attached to the end of a length of cable 34b which in turn conducts the electricity to the electrical equipment, for example through elbows 42 of transformer 41. The electric current exits transformer 41 through another elbow 42 which is connected to a length of cable 34c which in turn is connected to the other member of the by-pass device of the present invention so that electric current continues to be passed through conductive material 37 and exits from the fluid-and-electricity section 30b through length of cable section 34b *l with which it is connected.*

Figure 6:
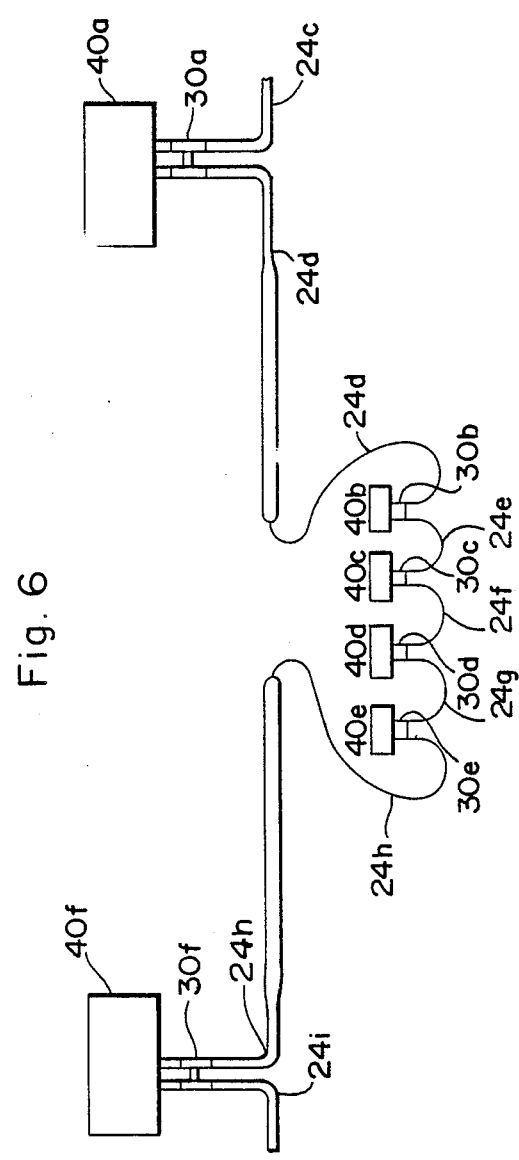
FIG. 6 schematically illustrates a plurality of pieces of electrical equipment interposed in series between lengths of cable connected by the by-pass, shown in more detail in FIGS. 3 and 4.

The arrangement of a series of cables 24d–24i connected to a plurality of by-pass devices 30a–30f and electrical apparatus 40a–40f are shown schematically in FIG. 6. In accordance with the present invention, therefore, means are provided for continuously introducing and supplying fluid to the interstices of conductive strands of cable while simultaneously and continuously passing electricity through the lengths of cable throughout an entire cable system, without interruption of either the current of electricity or the fluid being supplied through the cable system.

The unique method of the present invention may be performed in the above-discussed manner because of the novel design of fluid supply fitting 20 and fluid by-pass device 30. The fluid introduction fitting 20 may be attached to an end of any length of cable within a cable system. Once installed, and connected to a source of fluid, the desired fluid may be introduced into the cable system without causing an interruption in the supply of electricity from a power source through the conductive material of the cable. The fluid by-pass device 30 of the present invention permits fluid and electric current to be continuously supplied throughout a series of lengths of cables connected at periodic locations to pieces of electrical equipment without any interruption in the passage of fluid and electric current throughout the entire cable system by providing a separate passage for the fluid which by-passes the pieces of electrical equipment while permitting the electricity to complete its circuit through the equipment. Although not shown, a fitting for removing excess fluid from the cable system, i.e, a fluid withdraw fitting, similar in construction to fluid supply fitting 20, may be installed at an end of any length of cable so as to permit fluid to be removed from the interstices 4 of a length of cable and into a reservoir through a conduit, at any desired location in the cable system.

Figure 7:
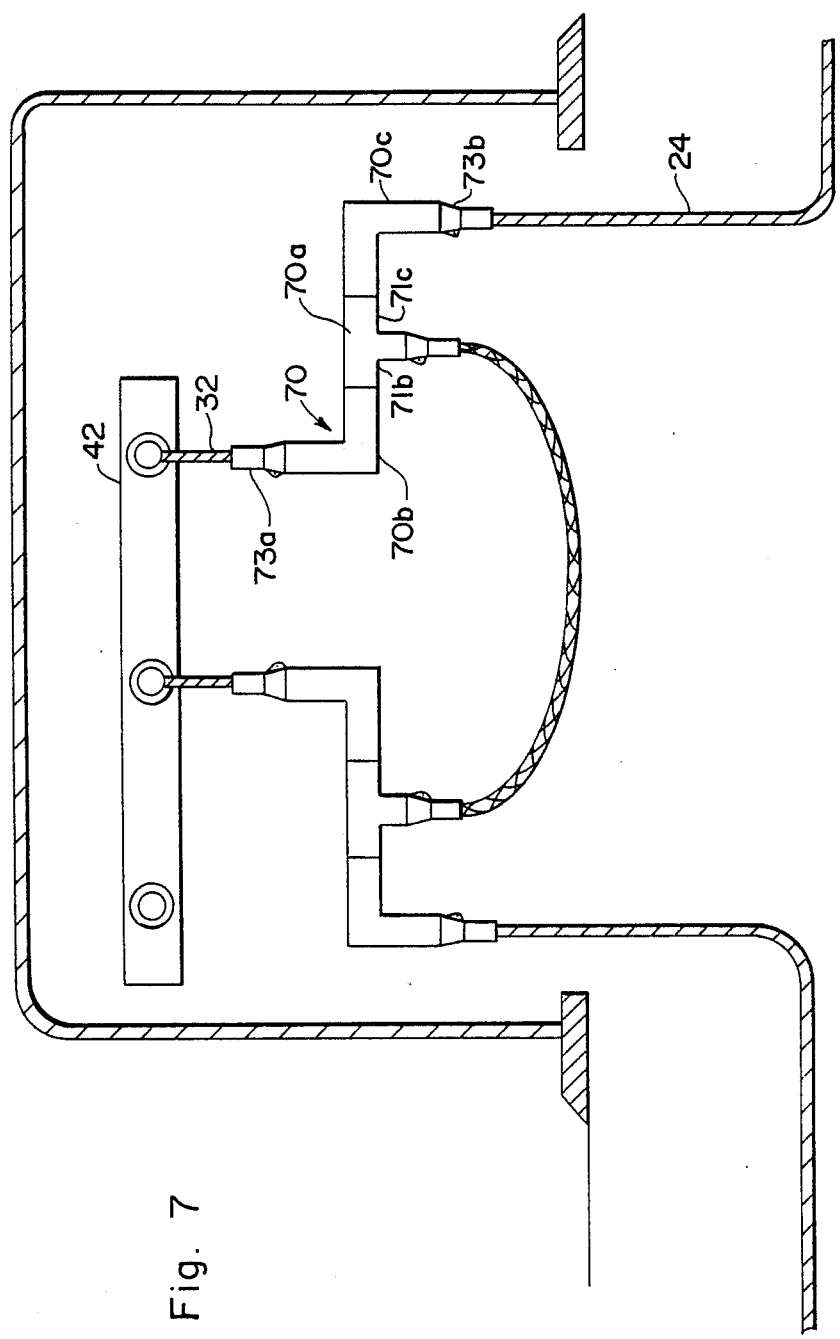
FIG. 7 is a side view of another embodiment of the by-pass assembled to have a Z shape.

FIG. 7 shows another embodiment of fluid by-pass device 70 of the present invention. In this embodiment, the sections of the by-pass device are assembled into a Z-shape. In this embodiment, section 70a corresponds exactly to the T-shaped element 30 of the H-shaped configuration of the by-pass device shown in FIG. 3. Instead of being provided with plugs at either end of section 71b, and 71c, however, it is interposed between and connected to generally L-shaped elements 70b and 70c which have an internal construction corresponding to that of sections 30b and 30c of the by-pass device. As shown, each of the L-shaped elements 70b and 70c are provided with plugs 73a and 73b, respectively, which in turn connect the by-pass device to the piece of electrical equipment 42 and length of cable 24. Thus, each Z-shape section is constructed using "tees", connectors and plugs similar to the "H" sections. The Z-shape fluid by-pass is advantageous because it is particularly suitable for use where the input and outlet opening of the electrical equipment are relatively close together. The Z-shape permits a relatively narrow configuration of the by-pass device compared to the H-shaped section, and is particularly useful when the space available for installation is limited. Being longer and narrower, the Z-shaped configuration may be more useful than the H-shaped section, which is significantly wider, in certain instances.

Figure 8:
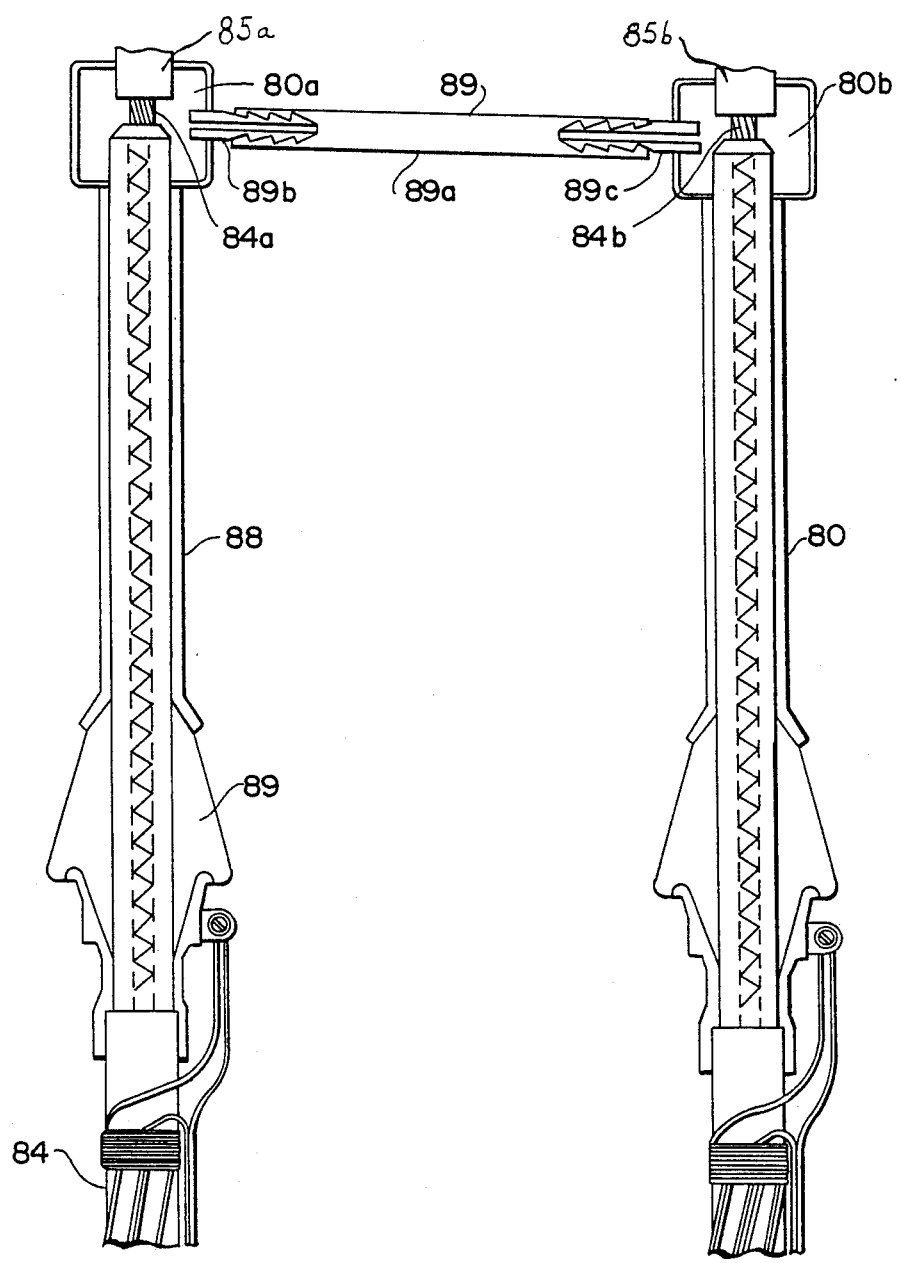
FIG. 8 is a side view of another embodiment of the by-pass device.

The by-pass device 80, shown in FIG. 8, is another embodiment of the present invention used where the transformer, switch or other electrical equipment, is "live-front" instead of dead-front, as has been the case in the previously discussed embodiments. In this embodiment, the by-pass device is composed of fittings 80a and 80b interconnected by conduit 89 which, as shown, is composed of a hollow tube 89a, which is preferably made from flexible material exhibiting excellent electrical insulation properties fitted over nozzles 89b and 89c which are attached so as to communicate to the interior space defined by fittings 80a and 80b, respectively. The fittings 80a and 80b are adapted to receive cable 84 and are provided with plugs 85a, 85b or other suitable electrical connectors for attaching to strands of conductor material 84a, 84b after the insulation and surrounding layers have been removed to expose a portion of the stranded conductive material. In a manner consistent with previously discussed embodiments, fluid is then permitted to seep from the interstices of the stranded conductive material to fill up the space within the fittings after which the fluid is conveyed through conduit 89 via nozzles 89b, tube 89a, and nozzle 89c into a corresponding fitting 89b while permitting the electricity to be conveyed through an appropriate piece of electrical equipment through a length of cable or other conductor connected to the fitting via plugs 85a and 85b.

In accordance with the above descriptions, the method and apparatus of the present invention permit the flow of fluid used to dry the cable and to impregnate the cable even when the cable is in service under normal operating conditions. The present invention has been found to be particularly suitable when used in conjunction with the inventions described in U.S. Pat. Nos. 4,372,988, and 4,545,133 so as to permit upgrading the cable system for large-scale use, such a supplying electric current to residential areas and business communities. The present invention is particularly suitable for use directly buried in the earth and, therefore, can provide means to by-pass apparatus that is installed underground, although the present invention is also suitable for use above ground for by-passing electrical apparatus that either has dead-front or live-front components.

From the foregoing description, one skilled in the art can easily ascertain the essential characteristics of this invention and, without departing from the spirit and scope thereof, make various changes and modifications of the invention to adapt it to various usages and conditions.

What is claimed is:

1. An apparatus for introducing and withdrawing fluid with respect to the interior of a cable composed of conductive material covered with insulation comprising:
   a fitting having a plurality of elongate sections extending radially from a point of intersection, said sections including:
   (i) a fluid section having a hollow core of conductive material with an end adapted to be connected to a reservoir of fluid;
   (ii) an electricity section having an essentially solid core of conductive material, adapted to be connected to a conductor of electric current; and
   (iii) an electricity-and-fluid section having a hollow core of conductive material in communication with said hollow core of conductive material of said fluid section adapted to be connected to a length of said cable through which fluid and electric current are to be passed.

2. The apparatus for introducing and withdrawing fluid with respect to the interior of a cable in accordance with claim 1, wherein said electricity section and said electricity-and-fluid section are longitudinally aligned along a common longitudinal axis with respect to said point of intersection.

3. The apparatus for introducing and withdrawing fluid with respect to the interior of a cable in accordance with claim 2, wherein said fluid section extends radially from said point of intersection at substantially a right angle with respect to said longitudinal axis along which said electricity section and said electricity-and-fluid section are aligned.

4. The apparatus for introducing and withdrawing fluid with respect to the interior of a cable in accordance with claim 3, wherein said fitting is generally T-shaped.

5. The apparatus for introducing and withdrawing fluid with respect to the interior of a cable in accordance with claim 4, wherein the cores of conductive material of said fluid section, said electricity section, and said electricity-and-fluid section are covered by a layer of insulation material.

6. The apparatus for introducing and withdrawing fluid with respect to the interior of a cable in accordance with claim 5, wherein said layer of insulation is surrounded by an outer jacket of semi-conductive material.

7. The apparatus for introducing and withdrawing fluid with respect to the interior of a cable in accordance with claim 6, wherein said fluid section further includes a hollow tube of non-conducting material having one end fitted to said end of said hollow core of conductive material and another end adapted to be fitted to a conduit connected to said reservoir of fluid.

8. The apparatus for introducing and withdrawing fluid with respect to the interior of a cable in accordance with claim 7, wherein said cable includes strands of conductive material surrounded by polyolefin insulation.

9. A by-pass device adapted to be connected to two lengths of cable through which fluid is being passed and electric current is being conducted and to a piece of electrical equipment through which the electric current is to be conducted, said by-pass device comprising:
   a first member and a second member, each of said members including:
   (i) an electricity-and-fluid section having a hollow core of conductive material adapted to be connected to an end of one of said two lengths of cable;
   (ii) an electricity section having a substantially solid core of conductive material in communication with said hollow core of conductive material of said electricity-and-fluid section and adapted to be connected to said piece of electrical equipment;
   (iii) a fluid by-pass section having a hollow core of conductive material in communication with said hollow core of conductive material in said electricity-and-fluid section and an end adapted to be connected to a conduit for conveying fluid in a divergent path away from said electric current;
   (iv) a conduit communicating between each said hollow core of conductive material of said fluid by-pass section so as to permit fluid to by-pass the electrical equipment without breaking the circuit of electric current through said lengths of cables and said piece of electrical equipment.

10. The by-pass device adapted to be connected to two lengths of cable through which electric current and fluid are being conveyed and to a piece of electrical equipment through which the electric current is to be conducted in accordance with claim 9, wherein said electricity section and said electricity-and-fluid section are longitudinally aligned along a common longitudinal axis.

11. The by-pass device adapted to be connected to two lengths of cable through which electric current and fluid are being conveyed and to a piece of electrical equipment through which the electric current is to be conducted in accordance with claim 10, wherein said fluid by-pass section extends from a point of intersection with said electricity section and said electricity-and-fluid section at substantially a right angle with respect to said longitudinal axis along which said electricity section and said electricity-and-fluid section are aligned.

12. The by-pass device adapted to be connected to two lengths of cable through which electric current and fluid are being conveyed and to a piece of electrical equipment through which the electric current is to be conducted in accordance with claim 11, wherein said by-pass device is generally H-shaped.

13. The by-pass device adapted to be connected to two lengths of cable through which electric current and fluid are being conveyed and to a piece of electrical equipment through which the electric current is to be conducted in accordance with claim 12, wherein the cores of conductive material of said fluid by-pass section, said electricity section, and said electricity-and-fluid outlet section are covered by a layer of insulation material.

14. The by-pass device adapted to be connected to two lengths of cable through which electric current and fluid are being conveyed and to a piece of electrical equipment through which the electric current is to be conducted in accordance with claim 13, wherein said layer of insulation is surrounded by an outer jacket of semi-conductive material.

15. The by-pass device adapted to be connected to two lengths of cable through which electric current and fluid are being conveyed and to a piece of electrical equipment through which the electric current is to be conducted in accordance with claim 14, wherein said fluid by-pass section further includes a hollow tube of non-conducting material having one end fitted to said end of said hollow core of conductive material and another end fitted to said conduit.

* * * * *

UNITED STATES PATENT AND TRADEMARK OFFICE
CERTIFICATE OF CORRECTION

PATENT NO. : 4,888,886

DATED : December 26, 1989

INVENTOR(S) : George S. EAGER, Jr., et al.

It is certified that error appears in the above-identified patent and that said Letters Patent is hereby corrected as shown below:

Column 6, line 37, change "t" to ---to---.
Column 7, line 5, change "have" to ---has---.
Column 9, line 47, delete "is" after "invention".
Column 10, line 38, change "$CH_3(CH_2)_{10}CH_2OH$" to ---$CH_3(CH_2)_{10}CH_2OH$---.
Column 14, line 56, change "40" to ---41---.
Column 15, line 24, delete "1" after "34b".
Column 16, line 44, change "nozzles" to ---nozzle---.
Column 16, line 45, change "39b" to ---80b---; and
Column 16, line 57, change "a" to ---as---.

Signed and Sealed this

Fifteenth Day of October, 1991

Attest:

HARRY F. MANBECK, JR.

*Attesting Officer*　　　　　　　*Commissioner of Patents and Trademarks*